(12) United States Patent
Jongsma et al.

(10) Patent No.: US 12,066,103 B2
(45) Date of Patent: Aug. 20, 2024

(54) POSITION MONITORING OF A GASKET BETWEEN TUNNEL SEGMENTS

(71) Applicant: FNV IP B.V., Leidschendam (NL)

(72) Inventors: Arnoud Marc Jongsma, Vijfhuizen (NL); Dennis Van Weeren, Nieuw Vennep (NL)

(73) Assignee: FNV IP B.V., Leidschendam (NL)

( * ) Notice: Subject to any disclaimer, the term of this patent is extended or adjusted under 35 U.S.C. 154(b) by 874 days.

(21) Appl. No.: 16/977,359

(22) PCT Filed: Mar. 6, 2019

(86) PCT No.: PCT/NL2019/050138
§ 371 (c)(1),
(2) Date: Sep. 1, 2020

(87) PCT Pub. No.: WO2019/172753
PCT Pub. Date: Sep. 12, 2019

(65) Prior Publication Data
US 2021/0108723 A1    Apr. 15, 2021

(30) Foreign Application Priority Data
Mar. 6, 2018  (NL) ..................... 2020541

(51) Int. Cl.
*F16J 15/06* (2006.01)
*E21F 17/18* (2006.01)
(Continued)

(52) U.S. Cl.
CPC ............. *F16J 15/064* (2013.01); *E21F 17/18* (2013.01); *G01B 11/002* (2013.01);
(Continued)

(58) Field of Classification Search
CPC ........ F16L 23/167; F16J 15/064; E21F 17/18; G01B 11/002; G01B 9/00; G01B 11/022;
(Continued)

(56) References Cited

U.S. PATENT DOCUMENTS 6,360,610 B1 * 3/2002 Jarzynski ............. F16J 15/3492
73/32 A
2001/0030396 A1 * 10/2001 Pecht .................... F16J 15/3492
277/317
(Continued)

FOREIGN PATENT DOCUMENTS

CN         101646923 A  *  2/2010 ............. G01D 11/00
CN         202420791 U  *  9/2012
(Continued)

OTHER PUBLICATIONS

Translation CN-205506741 (Year: 2016).*
(Continued)

*Primary Examiner* — Octavia Davis Hollington
*Assistant Examiner* — Monica S Young
(74) *Attorney, Agent, or Firm* — Polsinelli PC

(57) ABSTRACT

A method and sensor system for monitoring in time a geometric property of a gasket (32, 34) that sealingly interconnects two structural members (20, 21) of a subterraneous or immersed tunnel (10). The system includes a sensor (42) for measuring position indications for surface portions (48) of the gasket relative to a reference (26, 27, 47) associated with one or both structural members, and a processor (44) that is coupled with the sensor to receive the position indications. The processor is configured to derive indications of displacement (ΔY) for each of the gasket surface portions based on the measured indications of position, to compare the indications of displacement for each of the gasket surface portions with at least one threshold value (Continued)

(Ty), and to generate a warning message for an operator if at least one of the indications of displacement transgresses the at least one threshold value.

20 Claims, 8 Drawing Sheets

(51) Int. Cl.
    *G01B 9/00*         (2006.01)
    *G01B 11/00*       (2006.01)
    *G01B 11/02*       (2006.01)
    *G01B 11/16*       (2006.01)
    *G01B 11/27*       (2006.01)
    *G01M 13/005*     (2019.01)

(52) U.S. Cl.
    CPC ............. *G01M 13/005* (2013.01); *G01B 9/00* (2013.01); *G01B 11/022* (2013.01); *G01B 11/16* (2013.01); *G01B 11/27* (2013.01); *G01B 11/272* (2013.01)

(58) Field of Classification Search
    CPC ....... G01B 11/16; G01B 11/27; G01B 11/272; G01M 13/005
    USPC .......................................................... 73/760
    See application file for complete search history.

(56) References Cited

U.S. PATENT DOCUMENTS

| | | | |
|---|---|---|---|
| 2003/0042688 A1 | 3/2003 | Davie et al. | |
| 2005/0061076 A1* | 3/2005 | Kim | G01N 29/4418 73/594 |
| 2006/0261559 A1* | 11/2006 | Kudari | F16J 15/3484 277/306 |
| 2009/0315267 A1* | 12/2009 | Castleman | F16J 15/064 702/34 |
| 2010/0106429 A1* | 4/2010 | Horak | F16J 15/3492 702/34 |
| 2018/0372226 A1* | 12/2018 | Hauske | F16J 15/3492 |
| 2019/0133725 A1* | 5/2019 | Wong | A61C 9/0053 |
| 2022/0145538 A1* | 5/2022 | Kilbourne | D21G 9/0036 |

FOREIGN PATENT DOCUMENTS

| | | | | | |
|---|---|---|---|---|---|
| CN | 203320573 U | * | 12/2013 | | |
| CN | 103743558 A | * | 4/2014 | | |
| CN | 104634287 A | * | 5/2015 | ............. | G01B 17/02 |
| CN | 104807497 A | * | 7/2015 | | |
| CN | 103925004 B | | 1/2016 | | |
| CN | 103743558 B | * | 8/2016 | | |
| CN | 205506741 U | * | 8/2016 | | |
| CN | 109797782 A | * | 5/2019 | | |
| CN | 110836652 A | * | 2/2020 | ............. | G01B 21/02 |
| CN | 112161731 A | * | 1/2021 | ............... | G01B 7/02 |
| DE | 102015226311 A1 | * | 6/2017 | ........... | F16J 15/3492 |
| EP | 1727964 A1 | | 12/2006 | | |
| EP | 2138744 A1 | | 12/2009 | | |
| JP | 2005180044 A | | 7/2005 | | |
| WO | 2005080753 A1 | | 9/2005 | | |
| WO | 2015169707 A2 | | 11/2015 | | |
| WO | 2019172753 A1 | | 9/2019 | | |
| WO | WO-2020034461 A1 | * | 2/2020 | ........... | F16J 15/3452 |

OTHER PUBLICATIONS

Translation CN-202420791 (Year: 2012).*
CN_103743558 Aug. 2016 (Year: 2016).*
CN_104807497 Jul. 2015 (Year: 2015).*
CN_109797782 May 2019 (Year: 2019).*
International Search Report and Written Opinion; PCT Application No. PCT/NL2019/050138; mailed Jun. 21, 2019.
English abstract of JP2005180044; retrieved frow www.espacenet.com on Aug. 31, 2020.
English abstract of CN103925004; retrieved frow www.espacenet.com on Aug. 31, 2020.

* cited by examiner

POSITION MONITORING OF A GASKET BETWEEN TUNNEL SEGMENTS

CROSS-REFERENCE TO RELATED APPLICATIONS

This application is a national stage application of International Application No. PCT/NL2019/050138, which was filed on Mar. 6, 2019, which claims priority to Netherlands Application Number 2020541 filed on Mar. 6, 2018, of which is incorporated by reference in its entirety.

TECHNICAL FIELD

The invention relates to monitoring in time a geometric property of a gasket in an at least partially subterraneous and/or immersed structure.

BACKGROUND ART

Tunnels typically form an important constituent of road and/or railway networks. A tunnel is typically formed of a plurality of rigid (e.g. concrete) tubular elements that are several tens to hundred meters long, and which have cylindrical or rectangular cross-sectional shapes. These tubular elements are connected along edges in longitudinal directions, to form a tunnel structure with an internal passageway for passing through traffic. For tunnels that are constructed below the soil and/or water level, the rigid tube elements should be interconnected by joints that include flexible gaskets for preventing the outside environment (water, sediment etc.) from entering into the tunnel. These gaskets may for instance include rubber gaskets as described in patent document WO2015/169707A2.

Over time, the concrete elements may move relative to each other, and will be exposed to varying amounts of external (e.g. hydrostatic) pressure. The gaskets are required to maintain sealing under these conditions over many decades. In practice, the gaskets may develop problems which in certain cases lead to leakage, for instance as a result of significant bulging towards the inside of the tunnel. Once a leak has developed, it will be more difficult to repair.

In known methods, potential leakage through the gaskets into the tunnel interior is detected by visual inspection. This requires a maintenance team to open up a layer of cover panels and an inner gasket member (e.g. a curved and flexible secondary seal) between two tunnel segments from the inside of the tunnel, to enable visual inspection of the primary outer gasket member (e.g. an endless primary seal that includes a flexible compressed body) for potential defects, and propose corrective action if required. This known method is time consuming and labor intensive, and can only be performed when there is no traffic in the tunnel. This requires careful planning of inspections when traffic is absent e.g. when trains are not scheduled to pass through the tunnel, or when access to the tunnel is temporarily prohibited. As the inspections are scheduled in intervals, hazardous gasket deformations may arise in between periodically scheduled inspections, which will not be detected in time and may escalate quickly to cause leakage before a next scheduled inspection.

It would be desirable to provide systems and methods that improve on existing seal maintenance processes.

SUMMARY OF INVENTION

Therefore, according to a first aspect of the invention, there is provided a sensor system for monitoring in time a geometric property of a gasket. The gasket sealingly interconnects and extends along a path between adjacent edges of two structural members of an at least partially subterraneous and/or immersed structure. These structural members may for instance be building segments for a tunnel, barrier elements, basement walls, etc. The sensor system comprises a sensor and a processor. The sensor is configured to measure indications of position for a plurality of gasket surface portions at different measurement times and relative to a reference associated with at least one of the structural members. The processor is communicatively coupled with the sensor, to receive the measured indications of position. The processor is configured to derive indications of displacement for each of the gasket surface portions based on the measured indications of position, to compare the indications of displacement for each of the gasket surface portions with at least one threshold value, and to generate a warning message for an operator if at least one of the indications of displacement transgresses the at least one threshold value.

Monitoring the structural health of (at least partially) subterraneous and/or immersed infrastructures (e.g. tunnels) is of prime importance for maintenance. The structural members may for instance be concrete tunnel segments, each of which formed by interconnected walls that form a tube section. These concrete tube elements are interconnected by joints that include flexible gaskets for preventing material from outside the structure (e.g. water, sediment, etc.) form entering into the passageway that extends through the structure interior (e.g. the tunnel passageway). The gasket may form an endless (i.e. closed annular) trajectory, and may be arranged along mutually facing longitudinal edges of the structure segments.

Gaskets that significantly deform due to hydrostatic pressure from the water and soil surrounding the structure may eventually result in detrimental leaks. The automated sensor system allows continuous monitoring of gasket displacement without affecting traffic in the tunnel. By automated and continuous monitoring of gasket positions relative to the structural members, excessive bulging and potential failure of the gasket may be detected at an early stage. Once the system is installed, the system can automatically monitor the gasket in (near) real time, and warn an operator about potential imminent gasket failure at the earliest possible moment. Suspect and potentially hazardous conditions may be automatically detected at an early stage, and allows the operator to request a maintenance team to inspect the suspected seal and immediately decide on corrective action. The available time for corrective actions can thus be maximized, and exposure time of maintenance personnel in the tunnel (and health and safety risks) can be reduced to required inspections for suspect cases.

In system embodiments, the structural members are positioned so that the adjacent edges enclose a space with a non-zero gap width in a longitudinal direction, and the sensor is configured to be accommodated inside the space between the adjacent edges. This allows the automated sensor system to monitor gasket displacement continuously without obstructing the traffic in the tunnel, and allows the system to be shielded behind a cover to prevent access by unauthorized persons.

In further embodiments, the gasket forms a composite gasket that includes an outer gasket member and an inner gasket member. The inner gasket member extends in an annular path along the adjacent edges of the structural members, and faces an interior region of the structure. The outer gasket member extends in a further annular path along the adjacent edges and around the inner gasket member. The space may then form an annular space that is enclosed between the inner and outer gasket members and the adjacent edges of the structural members. The sensor may then be configured to be positioned inside the annular space and to measure a geometric property of the outer gasket member and/or the inner gasket member.

For structural members formed as interconnected concrete tube elements, the inner gasket member may for instance include a secondary seal that extends along and in-between the peripheral edges of the mutually joined tube elements, and the outer gasket member may for instance include a primary seal that extends around the secondary seal (viewed in a direction radially outwards from the tunnel interior), and which is located in-between the adjacent peripheral edges of the mutually joined tube elements. The annular space between these inner and outer gasket members may accommodate an autonomous sensor array, which can continuously or intermittently monitor the outer seal and/or the inner seal over a prolonged time, while leaving the inner and outer gasket members intact.

In embodiments, the gasket surface portions form parts of an inner gasket surface that faces towards an interior region of the structure. The sensor may then be configured to measure indications of transverse position for the gasket surface portions, relative to first and/or second walls of the structural members. In addition, the processor may then be configured to derive indications of transverse inwards displacement for each of the gasket surface portions based on the measured indications of transverse position.

Measurement of excessive inwards displacement (e.g. inwards bulging) of the gaskets due to hydrostatic pressure from the surrounding water and soil provides a detection method for detrimental leaks with a high statistical sensitivity.

In further embodiments, the gasket is mechanically and sealingly fixed to a first edge of a first one of the structural members, and abuts a second edge of a second one of the structural members while allowing slight relative motion while maintaining a sealing engagement. The gasket surface portions that are observed by the sensor may then be located at non-zero distances from the second edge and along the longitudinal direction, the distances being smaller than half of the gap width.

The gaskets serve to interconnect the structural members, and allow slight relative motion (e.g. in the order of millimeters to centimeters) between the structural members while ensuring that a seal is maintained. The gasket, or a primary sealing part thereof, is preferably rigidly fixed to one of the edges of the structural members, and tightly abuts the edge of the other structural member without being mechanically fixed thereto. The displacement/deformation amplitude of the gasket is expected to be largest near this non-attached abutting part of the gasket. By measuring displacement of the gasket surface portions near this abutting end of the gasket (i.e. $\Delta X_s < \frac{1}{2} \cdot \Delta X_g$), the relative displacement of the gasket will be measured with highest accuracy. The gasket surface portions and/or sensing elements of the sensor may for example be located at distances from the edge of the second structural member that are approximately ¼ of the size of the space defined between the adjacent wall edges (i.e. $\Delta X_s \approx \frac{1}{4} \cdot \Delta X_g$), to further improve measurement accuracy.

In embodiments, the gasket surface portions are arranged in a sequence of distinct surface positions along the gasket. In this case, the sensor system comprises a plurality of optical markers that are configured to be attached to the gasket surface portions, and the sensor is a camera that is configured to be placed at or near an edge of one of the structural members, and to acquire images of the optical markers that include the indications of position for the gasket surface portions at the measurement times.

A sensor system with a camera and attachable optical markers allows flexible adaptation of the number and spatial distribution of markers and number and spatial resolution of the camera(s) to local requirements. The gasket surface portions with optical markers may for instance be mutually spaced along the gasket with interspacing ranging between 5 and 50 centimeters, for instance a regular interspacing of about 30 centimeters.

In further embodiments, the gasket has a substantially linear gasket segment that extends along the adjacent edges of the structural members, and along which the distinct surface positions with the optical markers are consecutively arranged. The camera may then have a field of view that is directed substantially along the linear gasket segment.

The tube members may for instance have polygonal (e.g. rectangular) cross-sections, and the gaskets may have polygonal (e.g. rectangular) annular shapes that are congruent with the edges of the tube members. The camera may for instance be mounted on a distal end of a structural member edge e.g. in a corner region interconnecting two wall edges of a tube section with polygonal cross-section.

In yet further embodiments, the sensor system includes at least one optical reference marker that is configured to be fixed to at least one of the walls of the structural members at or near the corresponding one of the adjacent edges thereof. The camera may then be configured to acquire images of the optical markers as well as the optical reference marker, to obtain the indications of position for the gasket surface portions relative to the at least one of the walls.

Each of the optical markers and/or the optical reference markers may include an optical reflector or an active light source, and a base for attaching the respective marker to a corresponding gasket surface portion.

In alternative embodiments, the sensor system comprises a plurality of optical reflectors and at least one source of directional optical radiation. The optical reflectors are configured to be attached to the gasket surface portions, and the optical radiation source is configured to be placed at a source position at or near an edge of one of the structural members, and to emit a beam of optical radiation towards the optical reflectors. The sensor is an optical photogrammetric sensor that is configured to be placed at a sensor position or near an edge of one of the structural members, to receive reflected beams from the optical reflectors, and to measure reflection angles for the reflected beams corresponding with the position indications for the gasket surface portions.

The optical photogrammetric sensor (e.g. camera) may measure angles of reflected beams, which originate from the optical radiation source(s) and are reflected by the optical reflectors at distinct surface portions of the gasket, which are separated by a baseline distance. The radiation source may for instance be a LED with an optical system for generating an optical beam with a beam width that covers all the optical reflectors, or multiple beams that each cover a corresponding one of the optical reflectors. Alternatively, the radiation source may be a laser with an optical system for generating a beam or several beams that cover the optical reflectors. The processor may receive the measured reflection angles, and calculate indications of displacement for each of the gasket surface portions based on the measured angles of reflection and predetermined values for reference baseline lengths and orientation of the optical radiation source and beam.

In yet alternative embodiments, the gasket surface portions form a sequence of line segments along the gasket, and the sensor includes a plurality of optical fibers that are configured to be attached to the gasket at respective gasket surface portions. This sensor is configured to measure mechanical deformations of the optical fibers corresponding with the position indications for the gasket surface portions. The processor may then be configured to calculate the indications of displacement for each of the gasket surface portions using fiber Bragg grating, FBG, techniques.

According to yet alternative embodiments, the sensor includes a plurality of optical transceivers that are configured to be attached in a sequence along an edge of at least one of the structural members and facing respective ones of the gasket surface portions. Each of the optical transceivers may be configured to emit optical radiation towards a respective gasket surface portion, to receive further optical radiation returned by the respective gasket surface portion, and to measure the indications of position based on a comparison between the emitted and received optical radiations. The processor may then be configured to derive the indications of displacement for each of the gasket surface portions based on the measured indications of position.

For instance, the optical transceivers may be configured to emit optical radiation in the form of pulses towards the respective gasket surface portions, and configured to receive optical radiation in the form of return pulses reflected by the respective gasket surface portions. The indications of position may then correspond to time differences measured between emission of pulses and subsequent receipt of return pulses. Based on the measured time differences and a predetermined value for a propagation speed of the optical radiation, the processor may then calculate travel distances to derive the indications of displacement for each of the gasket surface portions.

Alternatively, the optical transceivers may be configured to emit optical radiation in the form of continuous waves towards the respective gasket surface portions, and configured to receive optical radiation in the form of continuous waves reflected by the respective gasket surface portions. The optical transceivers may then determine the distance to the corresponding gasket surface portion by deriving phase differences between the transmitted and received waves.

Optical time of flight (ToF) sensors are commercially available at low cost and require no secondary structure for reflecting the emitted radiation pulses to be fixed to the portions of the gasket. This sensors may be pre-mounted in arrays of standardized size in advance, which can be placed in a robust manner along the edges of the structural members. The optical transducers may for instance be placed in a linear array that is substantially parallel with the edge(s) of the structural member(s). Pre-fabricated sensor sections can be mounted underneath the inner gasket members (e.g. secondary seals) with relative ease.

The optical ToF sensors may for instance be configured to emit pulses of infrared radiation (IR) towards respective gasket surface portions, and to receive return pulses reflected by the respective gasket surface portions. Such IR ToF sensors may be employed when the ambient fluid that directly surrounds the monitored gasket predominantly consists of air (or other IR-transparent gas). In some situations, however, the gasket to be monitored is kept immersed in water (or possible another liquid medium), to enable cathodic protection of corrodible (e.g. iron) parts in/on the structure. For instance, a water pump may be employed to keep the area between the inner and outer gasket members filled with water. In these situations, the sensor system with light/IR ToF sensors may also be used, provided that the measured distance remains relatively small (e.g. up to about 200 millimeters), so that the reflected return signal is still sufficiently strong to be detected. In this case, the processor may be configured to compensate for the lower propagation speed $c_{water}$ for the light through the water (or $c_{liquid}$ in another liquid). For instance, in case COTS IR/optical ToF sensors that are configured for operation in air are used in a water-immersed monitoring setup, the processor may be configured to convert received sensor distance readings by multiplying with a factor $c_{water}/c_{air}$ ($\approx 22/30$) to obtain a correct indication of measured distance in water.

As alternative to optical ranging, the sensor system may operate based on radio detection and ranging (RADAR) sensors and techniques may be used. The transceivers may for instance include short distance radar units, with emission and reception bands in the W-band (for instance around 77 gigahertz).

According to yet alternative embodiments, the sensor includes a plurality of acoustic transducers that are configured to be attached in a sequence along an edge of at least one of the structural members and facing respective ones of the gasket surface portions. Each of the acoustic transducers is configured to emit an acoustic pulse towards a respective gasket surface portion, and to receive an acoustic return pulse reflected by the respective gasket surface portion, wherein the indications of position are time differences measured between emission of the acoustic pulses and subsequent receipt of the acoustic return pulses. The processor may then be configured to calculate travel distances from the measured time differences and a predetermined value for acoustic propagation speed, and to derive the indications of displacement for each of the gasket surface portions.

A system with ultrasonic transducers and ToF detection forms an alternative to optical ToF system implementations, and also does not require sensor elements to be fixed to the surface of the seals.

In yet alternative embodiments, the sensor system comprises a plurality of electromagnetic (EM) markers that are configured to be attached to respective gasket surface portions, and the sensor includes a plurality of EM transducers that are configured to be attached along an edge of at least one of the structural members, with each transducer facing a respective one of the EM markers. These EM transducers are configured to continuously generate EM fields, and to detect perturbations of the EM fields caused by the EM markers, to acquire the indications of position.

Sensor sections with pre-mounted arrays of EM transducers may be designed and manufactured in advance, which can be placed in a robust manner along the edges of the structural members. The EM transducers may for instance be placed in a linear array that is substantially parallel with the edge(s) of the structural member(s), and an equal number of EM markers may for instance be placed in a linear array along the gasket surface and co-extending with the array of EM transducers.

Detection of gasket deformation may be based on sensing by the EM transducers of perturbations of the EM fields from the EM transducers that are caused by the presence of the EM markers. The EM markers may for instance be electromagnetically capacitive and/or inductive structures. For instance, a tuned and resonating EM coil may become detuned by the proximity of a secondary piece of electrically conducting material (e.g. a metal) or a secondary resonating EM coil that is fixed to a respective gasket surface portion. The amount of de-tuning measured by the EM transducer may be used to derive a distance of the sensor to the secondary piece of material or resonator.

The sensor system may for instance be configured to detect EM field perturbations based on EM induction effects, to obtain a robust measurement method in the adverse conditions (e.g. moisture, dust, filth, water, and mould) in tunnels. The gasket may be provided with EM markers that have considerable inductance (e.g. ferrite plates) or electrical conductivity (e.g. metal plates). Such markers may even be attached to or embedded within the gasket in advance i.e. during manufacturing. In yet other alternatives, the EM markers may be formed by a coating with considerable inductance and/or electrical conductivity, which is applied to the inner surface of the gasket. This coating may for instance be a paint which ferromagnetic or electrically conductive particles in a flexible binder material.

In general, temperatures of the structure (e.g. a tunnel) may vary through night and day and with the seasons. Seasonal variations may have magnitudes of several tens of degrees, depending on climate and construction. A seal geometry monitoring sensor may exhibit temperature dependence which, if not accounted for, could cause the sensor to become out of specification. One approach to mitigate this problem may involve measurement of temperature dependency before installing the sensor, installing a temperature sensor with the distance sensor, and then correcting the distance measurement depending on the temperature reading. However, as the temperature dependence characteristic may vary between sensors, separate calibration of each sensor for the range of temperatures expected in the structure may be needed. Such a calibration approach significantly drives up the cost per sensor.

Therefore, in embodiments, the sensor system further comprises a temperature sensor, a heater element, and a temperature controller. The temperature sensor is arranged at or near the sensor, and is configured to continuously or intermittently measure indications of temperature of the sensor during operation of the sensor system. The heater element is arranged at or near the sensor, and is configured to provide heat to the sensor. The temperature controller is in signal communication with the temperature sensor and the heater element, and is configured to process the indications of temperature received from the temperature sensor and to control the heater element in order to keep a temperature of the sensor at a stable value above a maximum ambient temperature of the space enclosed by the gasket and adjacent edges of the structural members.

The temperature control function implemented in the software of the controller adjusts the amount of heating power continuously, in order to maintain a constant temperature reading of the temperature sensor. The temperature-vs-distance calibration can thus be limited to the single reference temperature that has been chosen, and significantly reduces sensor calibration efforts.

In a further embodiment, the sensor system includes a substrate, for instance a printed circuit board (PCB), which defines a first surface on which the sensor is arranged. The substrate includes cut-outs that extend from the first surface, entirely through the substrate, and to a second surface of the substrate being opposite to the first surface. The cut-outs extend around and enclose a partly isolated portion of the substrate where the sensor is located. These cut-outs are mutually separated by bridge portions, which mechanically connect the partly isolated portion to a remainder of the substrate that surrounds the cut-outs and the partly isolated portion. The cut-outs help to thermally insulate the sensor (for measuring gasket position indication) from the surrounding substrate, and limit the amount of power required to heat this sensor to this controlled and stable temperature.

In yet a further embodiment, the number of bridge portions equals three or four. Preferably, the bridge portions are arranged, viewed along the nominal plane of the substrate, in a regular (i.e. discrete rotationally symmetric and/or mirror symmetric) distribution around the partly isolated portion, in order to prevent mechanical displacement of the partly isolated portion relative to the remainder of the substrate.

In further embodiments, the temperature sensor and the heater element are both arranged near the sensor and at the partly isolated portion of the substrate. Preferably, the temperature sensor is arranged on the first surface of the substrate, and the heater element is arranged on the second surface.

According to a second aspect of the invention, and in accordance with the advantages and effects described herein above, there is provided a method for monitoring in time a geometric property of a gasket, wherein the gasket sealingly interconnects and extends along a path between adjacent edges of two structural members of an at least partially subterraneous and/or immersed structure. The method includes:
  providing a sensor system with a sensor and a processor according to the first aspect;
  measuring, with the sensor, indications of position for a plurality of gasket surface portions at different measurement times and relative to a reference associated with at least one of the structural members;
  deriving, with the processor, indications of displacement for each of the gasket surface portions based on the indications of position measured by the sensor;
  comparing, with the processor, the indications of displacement for each of the gasket surface portions to at least one threshold value, and
  generating a warning message for an operator if at least one of the indications of displacement transgresses the at least one threshold value.

In embodiments, the structural members are positioned so that the adjacent edges enclose a space with a non-zero gap width in a longitudinal direction. The method may then include accommodating the sensor inside the space between the adjacent edges, prior to measuring.

In embodiments, the gasket forms a composite gasket that includes an inner gasket member and an outer gasket member. The inner gasket member extends in an annular path along the adjacent edges of the structural members, and faces an interior region of the structure. The outer gasket member extends in a further annular path along the adjacent edges and around the inner gasket member. The space forms an annular space enclosed between the inner and outer gasket members and the adjacent edges of the structural members. The method may then further include positioning of the sensor inside the annular space, and measuring a geometric property of the outer gasket member and/or the inner gasket member.

In embodiments, the gasket surface portions form parts of an inner gasket surface that faces towards an interior region of the structure. The method may then further include:
  measuring, with the sensor, indications of transverse position for the gasket surface portions relative to first and/or second walls of the structural members, and
  deriving, with the processor, indications of transverse inwards displacement for each of the gasket surface portions based on the measured indications of transverse position.

In further embodiments, the gasket is mechanically and sealingly fixed to a first edge of a first structural member, and abuts a second edge of a second structural member to allow slight relative motion while maintaining a sealing engagement. The method may then further include observing, with the sensor, gasket surface portions that are located at non-zero distances from the second edge and along the longitudinal direction, the distances being smaller than half of the gap width.

In embodiments, in which the gasket surface portions are arranged in a sequence of distinct surface positions along the gasket, the sensor system may include a plurality of optical markers, and the sensor may be a camera. The method may then further include:
- attaching the optical markers to the gasket surface portions;
- placing the camera at or near an edge of one of the structural members, and
- acquiring, with the camera, images of the optical markers at the measurement times to obtain the indications of position for the gasket surface portions.

In a further embodiment, the sensor system comprises at least one optical reference marker. The method may then further include:
- fixing the optical reference marker to at least one of the walls of the structural members at or near the corresponding one of the adjacent edges thereof;
- acquiring, with the camera, images of the optical markers as well as the optical reference marker, to obtain the indications of position for the gasket surface portions relative to the at least one of the walls.

In alternative embodiments, in which the gasket surface portions are arranged in a sequence of distinct positions along the gasket, the sensor may include a plurality of optical transceivers that are configured emit and receive pulses of optical radiation. The method may then further include:
- attaching the optical transceivers in a sequence along an edge of at least one of the structural members and facing respective ones of the gasket surface portions;
- emitting, with the optical transceivers, pulses of optical radiation towards a respective gasket surface portion;
- receiving, with the optical transceivers, return pulses of optical radiation reflected by the respective gasket surface portions;
- measuring time differences between emission of pulses and subsequent receipt of corresponding return pulses, to obtain the indications of position, and
- calculating, with the processor, travel distances from the measured time differences and a predetermined value for a propagation speed of the optical radiation, to derive the indications of displacement for each of the gasket surface portions.

In yet alternative embodiment, in which the gasket surface portions are arranged in a sequence of distinct positions along the gasket, the sensor system may comprise a plurality of EM markers, and the sensor may include a plurality of EM transducers that are configured to generate EM fields and to detect perturbations of the EM fields. The method may then include:
- attaching the EM markers to respective gasket surface portions;
- attaching the EM transducers along an edge of at least one of the structural members, with each transducer facing a respective one of the EM markers;
- generating, with the EM transducers, EM fields, and
- detecting, with the EM transducers, perturbations of the EM fields caused by the EM markers, to acquire the indications of position.

According to a third aspect of the invention, and in accordance with the advantages and effects described herein above, there is provided a computer readable medium storing instructions, which when executed by one or more processors, causes the one or more processors to execute one of the methods according to the second aspect.

According to a fourth aspect of the invention, and in accordance with the advantages and effects described herein above, there is provided a computer program product configured to provide instructions to carry out one of the methods according to the second aspect, when loaded on a computer arrangement.

According to a fifth aspect, there is provided a structure, for instance a tunnel, which is configured to be arranged at least partially within a body of soil and/or water to form part of a road or railroad network. The structure includes at least two tubular structural members, which are interconnected along adjacent edges and define an internal passageway for passing through traffic, a gasket that sealingly interconnects and extends along a path between the adjacent edges, and a sensor system in accordance with the first aspect.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "46" may be labeled as "46a" and "46b". The reference number may be used without an appended letter to generally refer to an unspecified instance or to all instances of that element, while the reference number will include an appended letter to refer to a specific instance of the element.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

The term "surface" is used herein to generally refer to a two-dimensional parametric surface region, which may have either an entirely or piece-wise flat shape (e.g. a plane or polygonal surface), a curved shape (e.g. cylindrical, spherical, parabolic surface, etc.), a recessed shape (e.g. stepped or undulated surface), or a more complex shape. The term "plane" is used herein to refer to a flat surface defined by three non-coinciding points.

The term "path" refers herein to a non-intersecting line trajectory that extends in three-dimensional space.

In the next figures, Cartesian coordinates will be used to describe spatial relations for exemplary embodiments of the sensor system. Reference symbol X is used to indicate a longitudinal direction, which is associated with a direction along the passage through the tunnel. Reference symbol Y is used to indicate a first transverse direction that is perpendicular to X, and reference symbol Z is used to indicate a second transverse direction that is perpendicular to X and Y. Z corresponds predominantly with a vertical direction associated with gravity.

It should be understood that the directional definitions and preferred orientations presented herein merely serve to elucidate geometrical relations for specific embodiments. The concepts of the invention discussed herein are not limited to these directional definitions and preferred orientations. Similarly, directional terms in the specification and claims, such as "top," "bottom," "left," "right," "up," "down," "upper," "lower," "proximal," "distal" and the like, are used herein solely to indicate relative directions and are not otherwise intended to limit the scope of the invention or claims.

Figure 1:
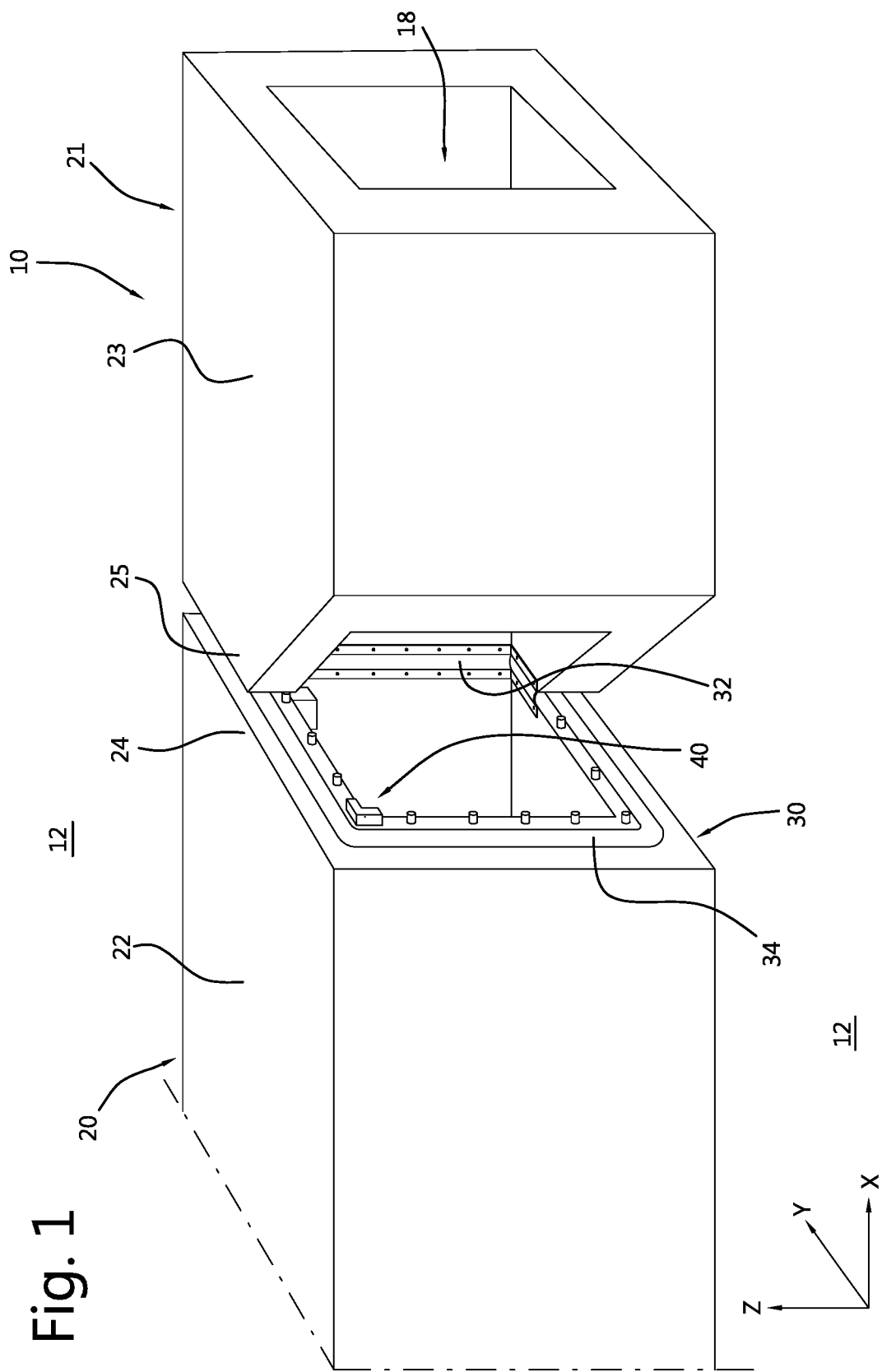
FIG. 1 schematically shows a tunnel with a sensor system according to an embodiment.

FIG. 1 schematically shows an exemplary embodiment of a tunnel 10. The tunnel 10 forms part of a road or railroad network, and extends at least partially within a body of soil 12 that is below a ground water level. The tunnel 10 includes a plurality of interconnected tubular structural members ("tube members"), of which only two tube members 20, 21 are shown in FIG. 1. The tube members 20, 21 are formed by concrete wall sections 22, 23 that have rectangular cross-sectional shapes in transverse directions Y, Z perpendicular to a longitudinal direction X, and which surround an internal passageway 18 for passing through traffic. The tube members 20, 21 may be several tens to hundred meters long. The wall sections 22, 23 terminate in wall edges 24, 25 at longitudinal ends of each respective tube member 20, 21. The tube members 20, 21 are interconnected along adjacent wall edges 24, 25.

Part of the right tube member 21 in a central region of FIG. 1 has been omitted, to show a gasket 30 and a sensor system 40. The gasket 30 is provided between the tube members 20, 21. This gasket 30 extends along a closed rectangular path around the passageway 18, and is arranged between the adjacent edges 24, 25 so as to interconnect the tube members 20, 21 along these edges 24, 25 in a sealed (e.g. watertight) manner. The gasket 30 is of a composite design, and includes an outer primary gasket member 34 and an inner secondary gasket member 32. The inner gasket member 32 extends in an annular path along the wall edges 24, 25, and faces the tunnel interior 18. The outer gasket member 34 extends in a closed annular path along the wall edges 24, 25 and around (i.e. transversally outward relative to) the inner gasket member 32.

Figure 2A:
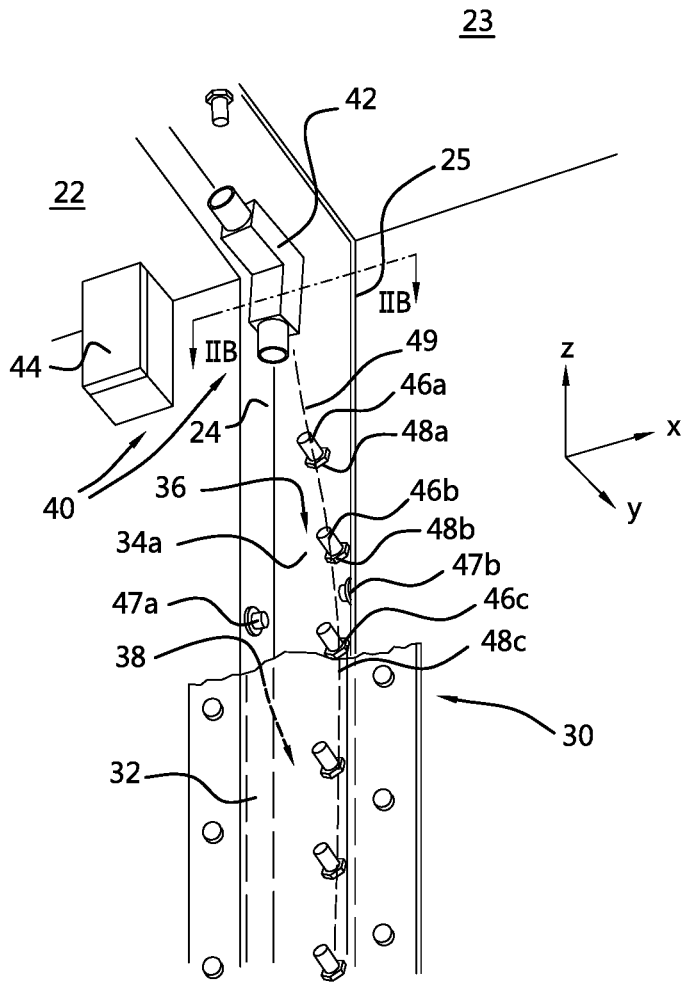
FIGS. 2a-2b present perspective and cross-sectional views of a sensor system according to an embodiment.
Figure 2B:
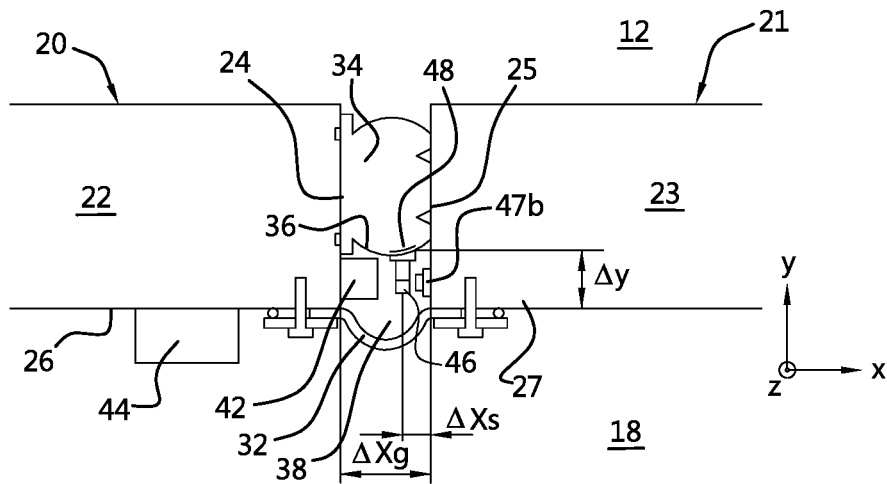

The wall edges 24, 25 do not directly abut, but enclose a relatively small space in the longitudinal direction X (see e.g. FIG. 2b). The sensor system 40 is positioned inside the tunnel 10, and includes sensor components that are located within the space between the wall edges 24, 25. This sensor system 40 is configured to monitor at least one geometric property of the outer gasket member 34 in time.

FIGS. 2a-2b illustrate an exemplary embodiment of a sensor system 40 for deployment in the tunnel 10 of FIG. 1 and for monitoring geometric properties of the gasket 30. The sensor system 40 includes a sensor 42, a plurality of optical markers 46a, 46b, 46c and optical reference markers 47a, 47b, and a processor 44.

The tube members 20, 21 are positioned so that the adjacent edges 24, 25 of the walls 22, 23 enclose a space 38 with a non-zero gap width $\Delta X_g$, viewed in the longitudinal direction X. The inner and outer gasket members 32, 34 also enclose this space 38, but viewed along the transverse direction (being Y or Z, depending on the orientation of the wall segments 22, 23). The resulting annular space 38 extends around the tunnel interior 18 and is enclosed between the inner and outer gasket members 32, 34 and the wall edges 24, 25.

In this example, each marker 46 includes an active light source (e.g. an LED). The optical markers 46 are accommodated inside the annular space 38, and are attached to the gasket surface portions 48. The surface portions 48 form parts of an inner surface 36 of the outer gasket member 34 that face towards the tunnel interior 18. The outer gasket 34 has a segment 34a that is substantially linear, and which co-extends with a flat wall section of the rectangular tube sections 20, 21. The gasket surface portions 48 are arranged in a sequence of distinct surface positions 48a, 48b, 48c along this gasket segment 34a, but extend in a slightly curved trajectory 49. Here, the markers 46 are interspaced at uniform distances d along the longitudinal direction of the gap 38. A distance $\Delta Z_i$ of marker i to the observing camera 42 may be described by $\Delta Z_i = i \cdot d$, whereas a transverse displacement $\Delta X_i$ of marker i from the optical axis of the camera may be described by $\Delta X_i = \tan(\varphi + i \cdot \alpha) \cdot i \cdot d$, with $\varphi$ the tilt angle for the first marker from the optical axis about the origin at the camera position, and $\alpha$ the differential angle between subsequent markers 46.

The optical reference markers 47 are also accommodated inside the annular space 38, and are fixed to the inner edges 24, 25 of the walls 22, 23. In this example, each reference marker 47 also includes an active light source (e.g. an LED).

The sensor 42 is also accommodated inside the annular space 38, and includes photogrammetric cameras 42 that are placed against and fixed to the wall edge 24 of tube member 20, in corners between orthogonal wall segments. Each camera 42 has a field of view that is directed substantially along the corresponding linear gasket segment 34a with the markers 46, and along the inner wall edges 24, 25 with the reference markers 47. The cameras in the depicted unit 42 may be pointed along distinct linear segments of the gasket 34. For instance, one of the cameras may view down along the side gasket segment 34a, whereas another camera 42 may view laterally along a roof gasket segment (not indicated). A similar camera unit may be arranged in a mirror-symmetric manner in the opposite corner.

When the sensor system 40 is operational, each of the cameras 42 continuously or intermittently acquires images that cover both the optical markers 46 and the optical reference marker 47 of a respective gasket segment 34a, to allow displacement detection of any of the optical markers 46 relative to the optical reference markers 47, and thus measure indications of position for the gasket surface portions 48 in time.

The processor 44 is communicatively coupled with the cameras 42 to receive measured indications of position. This processor 44 is programmed to derive indications of displacement ΔY for each of the gasket surface portions 48 based on the indications of position measured by each of the cameras 42, to compare the derived indications of displacement ΔY with threshold values Ty, and to generate a warning message for an operator if at least one of the indications of displacement transgresses the corresponding threshold value Ty.

FIG. 2b illustrates that the outer gasket 34 is mechanically and sealingly fixed to inner wall edge 24 of the first tunnel member 20, and abuts inner wall edge (i.e. distal face) 25 of the second tunnel member 21 while allowing slight relative motion but maintaining sealing engagement between the outer gasket 34 and wall edge 25.

The gasket surface portions 48 observed by the camera 42 are located at non-zero distances ΔXs from wall edge 25, viewed along the longitudinal direction X. Each of these distances ΔXs is smaller than half of the gap width ΔXg. In this example, the markers 46 are located along the curved trajectory 49 at distances $0.1 \cdot \Delta Xg \leq \Delta Xs \leq 0.5 \cdot \Delta Xg$ from wall edge 25. The camera 42 images displacement of the markers 46 relative to the reference markers 47, and thereby acquires indications of transverse position for the gasket surface portions 48 relative to the first and second walls 22, 23. Based on the measured transverse position indications, the processor 44 derives indications of transverse inwards displacement ΔY for each of the gasket surface portions 48.

Figure 3A:
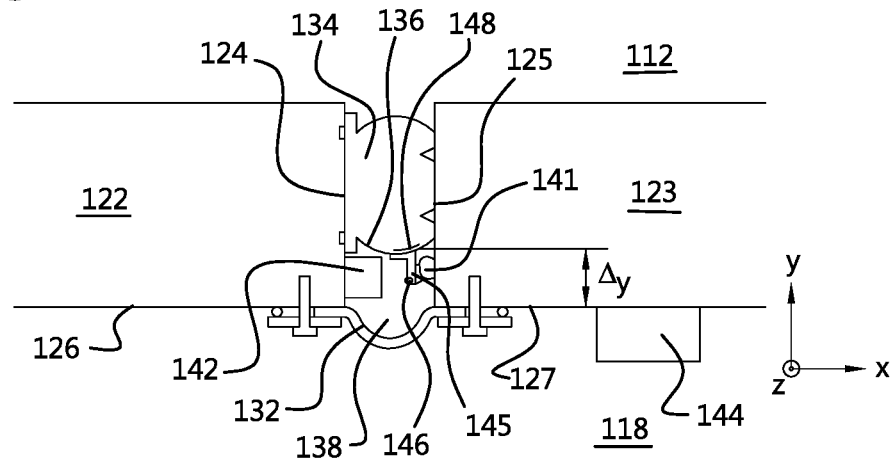
FIGS. 3a-3b present perspective and cross-sectional views of a sensor system according to another embodiment.
Figure 3B:
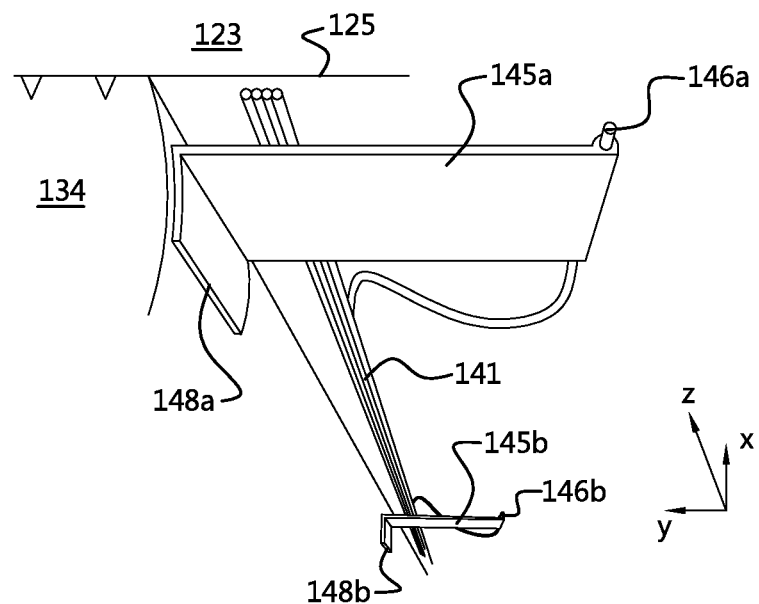

FIGS. 3a-3b show another embodiment of a sensor system 140. Features in the sensor system that have already been described above with reference to the embodiments in FIGS. 1-2b may also be present in the system 140 shown in FIGS. 3a-3b, and will not all be discussed here again. For the discussion with reference to FIGS. 3a-3b, like features are designated with similar reference numerals preceded by 100, to distinguish the embodiments.

In this example, optical fibers are use as light guides for conveying optical signals and emitting respective signals from corresponding ends of the fibers 146a, 146b, to be imaged by a camera unit 142 arrangement that is similar to the configuration in FIGS. 2a-b. The fibers are bundled in a wire harness 141 that extends inside the annular space 138 and along wall edge 125. Individual fibers 146 branch off from this wire harness 141 and are locally connected via separate brackets 145a, 145b to respective surface portions 148a, 148b of the gasket 134. Each optical signal may be attributed a unique optical signature e.g. by using specific encoding, wavelength, and/or brightness characteristics. This fiber-based marker arrangement is highly resistant to moist and dust.

Figure 4A:
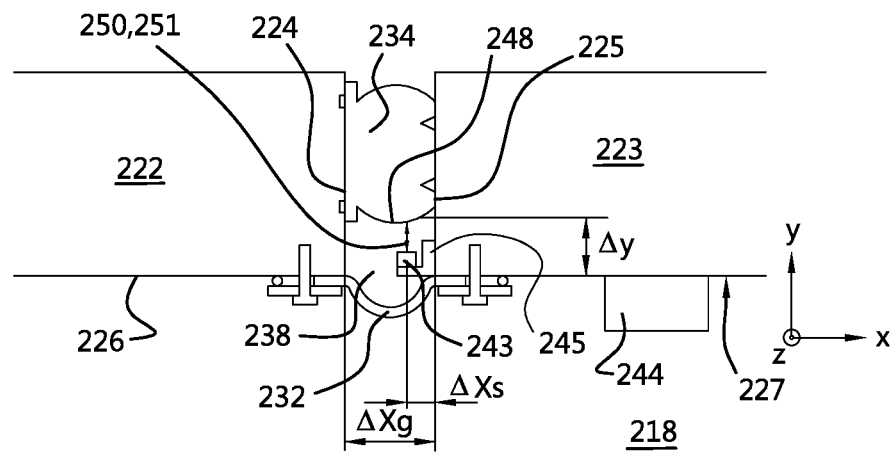
FIGS. 4a-4b present perspective and cross-sectional views of a sensor system according to yet another embodiment.
Figure 4B:
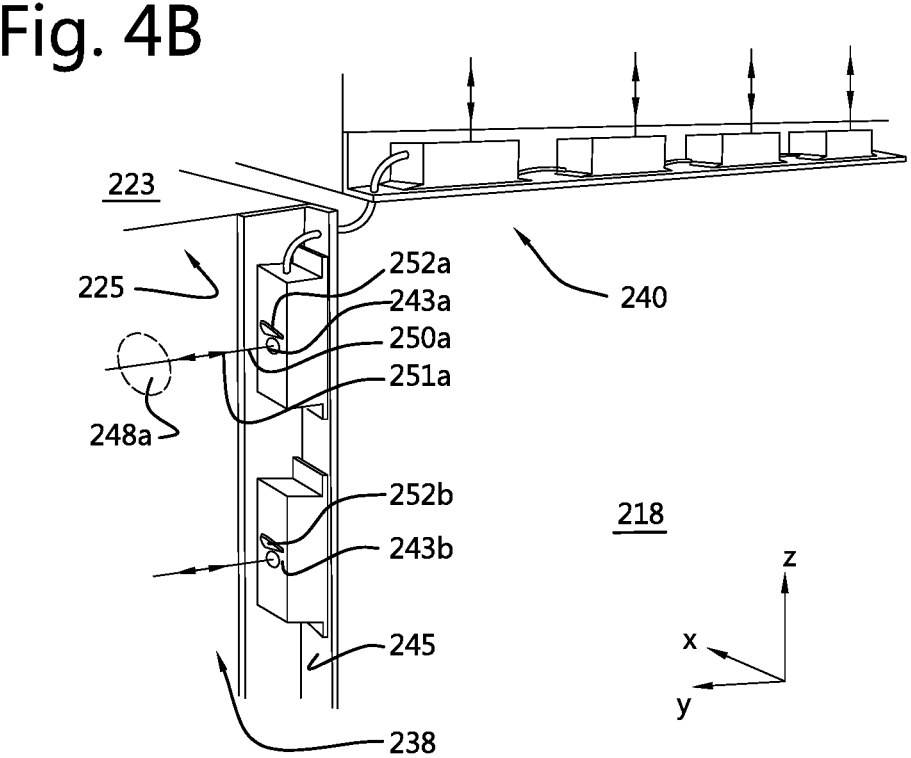

FIGS. 4a-4b present cross-sectional and perspective views of a sensor system 240 according to yet another embodiment. Features in this sensor system 240 that have already been described above with reference to the embodiments in FIGS. 1-3b may also be present in the system 240 shown in FIGS. 4a-4b, and will not all be discussed here again. Like features are designated with similar reference numerals preceded by 200 to distinguish embodiments.

In this exemplary system 240, the sensor 242 includes a plurality of optical transceivers 243a, 243b, 243c that are pre-mounted in arrays onto L-shaped brackets 245. Each transceiver unit 243 is accommodated in a watertight housing with a window for passing through optical signals. The transceiver unit 243 includes a rotatable wiper blade 252 on an outside of the housing, to remove dust or condense from the window that would otherwise hamper transmission of optical signals.

Also in this system 240, the brackets 245 have standardized lengths of approximately 2 meters. The brackets 245 are arranged with adjacent distal ends in a consecutive manner, and located inside the annular space 238 underneath the secondary gasket 232. Each bracket 245 is mounted via one flange along the wall edge 225 so that each transceiver 243 faces a respective one of the gasket surface portions 248. The transceivers 243 associated with each distinct bracket 245 are interconnected via power and data busses. Further brackets 245 with transceivers 243 are mounted along gasket segments 234 that co-extend with the ceiling wall and opposite sidewall. The power and data busses of consecutive brackets 245 are interconnected, thus forming an interconnected ToF sensor array with a rectangular U-shape that extends through the side and ceiling sections of the annular space 238.

When the system 240 is operational, the transceivers 243 intermittently emit pulses of optical radiation 250a towards respective gasket surface portions 248a, and receive return pulses 251a reflected by the respective gasket surface portions 248a. Each time, the transceiver 243 measures a time difference (i.e. ToF) between emission of a pulse 250 and subsequent receipt of a return pulse 251, to obtain an indication of gasket position. The processor 244 receives measured time differences from all the transceivers 243 at associated measurement times, calculates travel distances from these measurements and a predetermined optical propagation speed, and derives indications of displacement ΔY for each gasket surface portion 248 at the associated measurement times.

In this example, the optical ToF transceivers 243 have a ranging resolution of approximately 1 millimeter. The transceivers 243 further have a detection range of approximately 200 millimeters. If the nominal distance between non-displaced surface portion 248 and transceivers 243 that reside within the transverse depth of the annular gap 238 is approximately 100 millimeters, this detection range allow detection of gasket deflections in an expected range of ±50 millimeters relative to the non-displaced situation.

In alternative embodiments, the sensor system may operate in a similar manner but based on radar techniques using short distance radar transceivers near and directed towards the gasket surface portions, or on sonar techniques using ultrasonic transceivers near to and directed towards the gasket surface portions.

Figure 5:
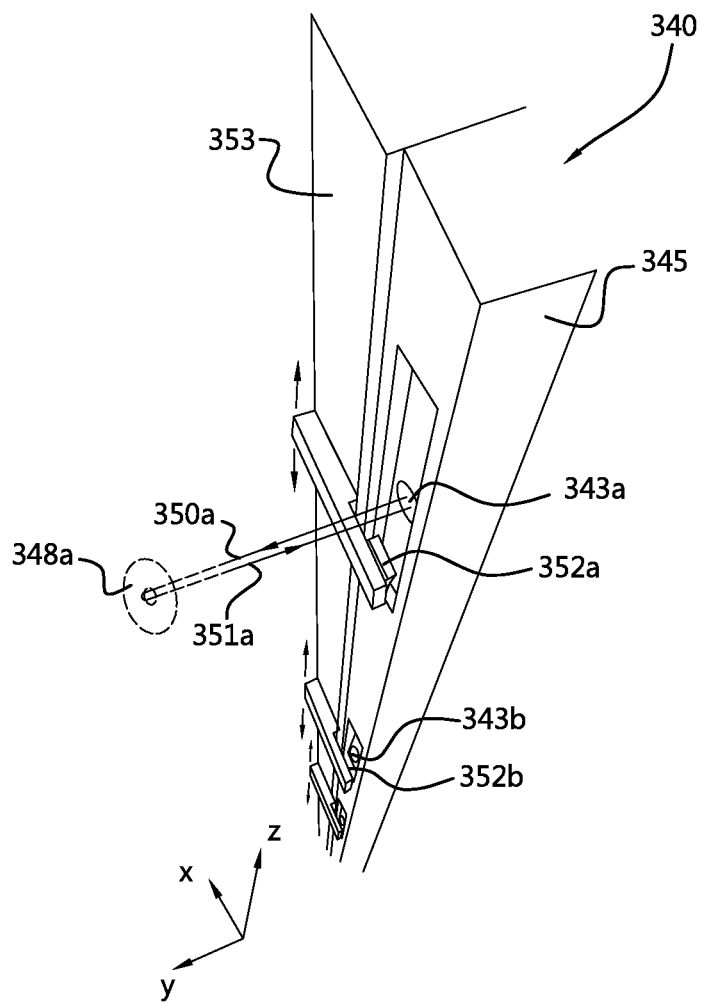
FIG. 5 presents a perspective view of a sensor system according to yet another embodiment.

FIG. 5 illustrates yet another embodiment of a sensor system 340. This exemplary sensor system 340 largely resembles the sensor system 240 described with reference to FIGS. 4a-4b. Features that have already been described above with reference to the embodiments in FIGS. 1-3b will not all be discussed here again, and like features are designated with similar reference numerals preceded by 300.

In this exemplary system 340, multiple ToF transceivers 343 are accommodated in a linear array inside a single elongated rectangular housing 345 of approximately 2 meters long. Each of the optical ToF transceivers 343 is configured to emit pulses of infrared radiation (IR) 350 towards a respective gasket surface portion 348, and to receive return pulses 351 reflected by the respective gasket surface portion 348. The housing 345 is mountable along one of the tunnel wall edges and underneath the second gasket, and seals the transducers 443 and interconnecting circuitry from the humid environment inside the annular space between the walls and the gaskets (not shown).

This housing 345 includes a plurality of translatable wiper blades 352, which are provided near each transducer window on an outside of the housing 345. These wiper blades 352 serve to remove dust or condense from the windows at desired moments. Each wiper blade 352 includes an elongated wedge-shaped wiper member that engages with a free distal sharp edge an outwards surface of a respective window. This distal edge of the wiper member extends across the window and transverse to a direction corresponding with the wiping motion of the blades 352 (indicated by arrows) along the elongation direction of the housing 345. In this example, the wiper member consists essentially of brass. Alternatively, the wiper blades may be made of any non-corrosive material that is sufficiently rigid and wear resistant to maintain engagement with the window for a prolonged time (e.g. years), but with a hardness that is lower than the window material to avoid scratching of the window during wiping.

All wiper blades 352 of one housing assembly are interconnected and jointly translatable by a single wiper actuator bracket 353. This bracket 353 is actuated by a single mechanism, which in this example comprises a sealed direct current motor and a linear spindle (not shown) that are accommodated inside the housing 345. This yields a robust actuator mechanism for jointly moving the wiper blades 352.

Figure 6A:
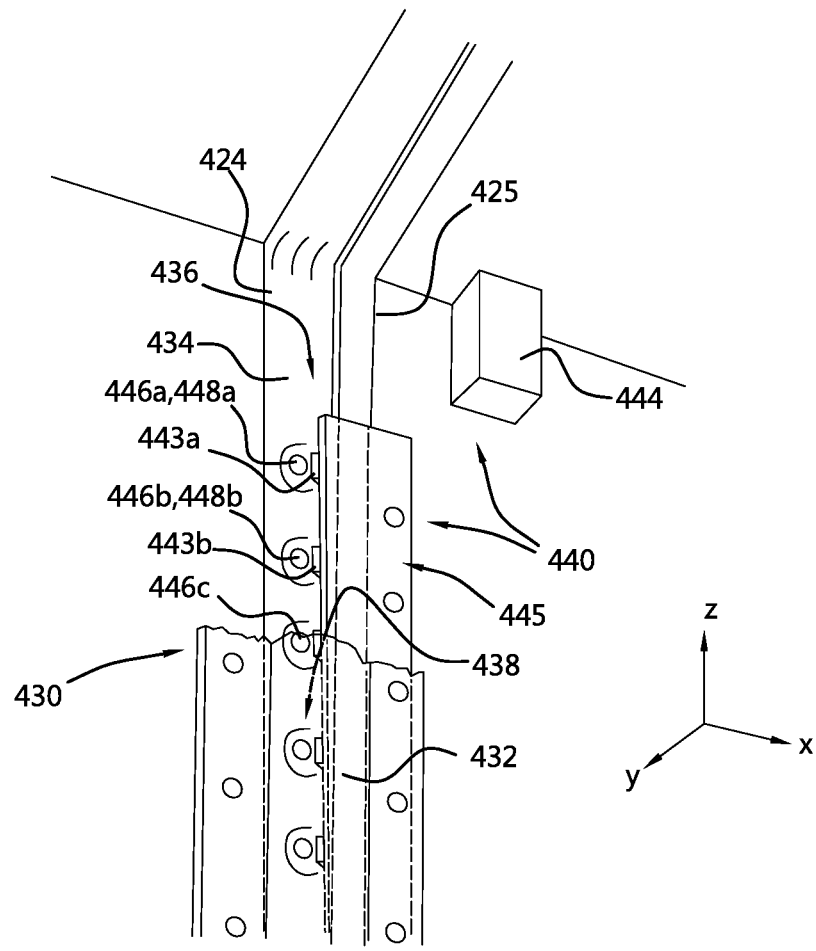
FIGS. 6a-6b present perspective and cross-sectional views of a sensor system according to yet another embodiment.
Figure 6B:
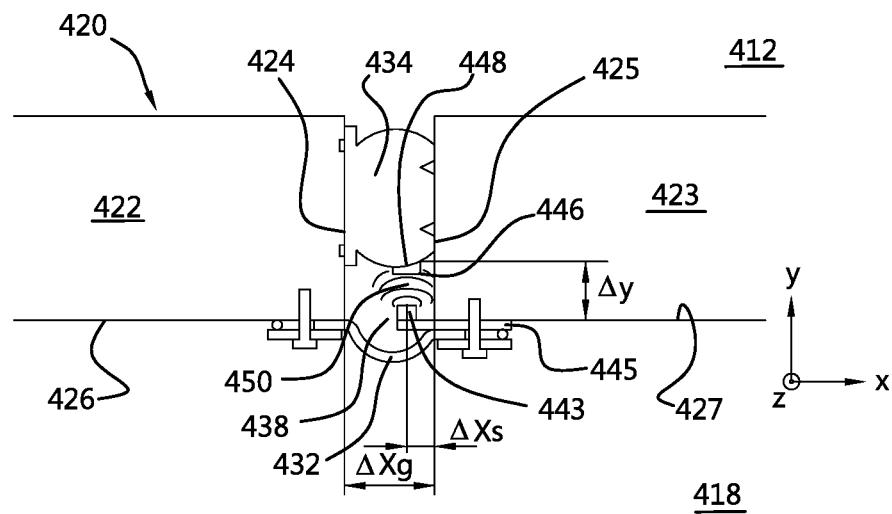
Figure 6C:
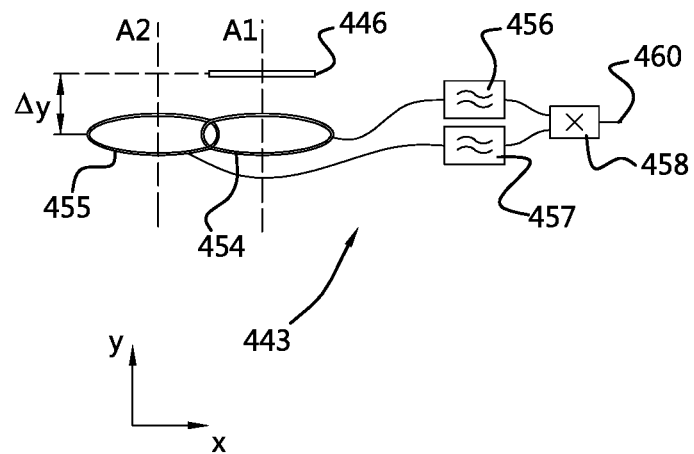
FIG. 6c schematically illustrates a sensor implementation for the system from FIGS. 6a-6b.

FIGS. 6a-6c illustrate yet another sensor system embodiment 440. FIGS. 6a-6b show perspective and cross-sectional views of this sensor system 440, and FIG. 6c schematically illustrates implementation details of a sensor in this system 440. Features in this system 440 that have already been described above with reference to embodiments in FIGS. 1-5 may also be present in the system 440 shown in FIGS. 6a-6c, and will not all be discussed again. Like features are designated with similar reference numerals preceded by 400.

In this exemplary system 440, the sensor includes a plurality of electromagnetic (EM) transducers 443a, 443b, which are pre-mounted in a linear arrays along a corresponding mounting plate 445. The system 440 also includes a plurality of EM markers 446a, 446b, which in this example include ferrite plates with considerable magnetic inductance that are attached to the inner surface 436 of gasket 434 at respective surface portions 448a, 448b.

Each plate 445 is mounted via one flange along tunnel wall 427 and underneath the secondary gasket 432. Each EM transducer 443 faces a respective gasket surface portion 448 and marker 446. Additional plates 445 with transducers 443 (not shown in FIG. 6a) are arranged with adjacent distal ends in a consecutive manner, and extend inside and through the annular space 438. When the system 440 is operational, the transducers 443 continuously generate local EM fields 450 with characteristics that also depend on the proximity of the associated marker 446.

FIG. 6c schematically illustrates implementation details of an EM transducer 443 from this system 440. The EM transducer 443 includes two tuned and resonating EM coils 454, 455, which are placed in a double-D configuration, in which the D-shaped coil loops co-extend and partially overlap within a thin planar volume that is substantially parallel with the surface of the associated EM marker 446 at the nearby gasket surface portion 448. A first coil 454 is placed with a first nominal coil axis A1 substantially parallel with a (local) normal vector of the marker 446 at the nearby gasket surface portion 448, and serves as a sensing coil. A second coil 455 is placed with a second nominal coil axis A2 substantially parallel with the first axis A1, but displaced along the longitudinal direction X relative to the marker 446. Coils 454 and 455 are depicted in FIG. 6c with a single turn of a conductor, but in practice have multiple turns. The longitudinal displacement of the second coil axis A2 allows the second coil 455 to serve as a reference coil. The coils 454, 455 have identical dimensions and number of turns, to allow compensation for temperature-induced disturbances. The coils are both embedded in the same flat carrier body, to keep the shapes of both coils 454, 455 as constant as possible. The carrier body has homogeneous and isotropic thermal expansion characteristics, to ensure that the shapes of both coils 454, 455 are deformed in identical manner so that resonance properties vary together and that magnetic decoupling is maintained in the case of thermally induced deformation of the carrier body. In this example, the carrier body is a printed circuit board (PCB) that consists essentially of non-ferromagnetic material with a very low coefficient of thermal expansion.

A first source of alternating current (or first oscillator) 456 is connected across two terminals of the first coil 454, which allows the first coil 454 to generate an alternating magnetic field 450 in its vicinity. Such magnetic field may induce magnetization in and/or eddy currents along the nearby marker 446, which in turn creates a magnetic perturbation field that may be sensed by the first coil 454 as a shift in resonance properties of the first coil circuit.

Similarly, a second source of alternating current (or second oscillator) 457 is connected across two terminals of the second coil 455, which allows the second coil 455 to generate a further alternating magnetic field in its vicinity. The first and second oscillators 456, 457 have identical outputs, at least in the absence of external magnetically (re-)active bodies.

Local displacement of the gasket surface portion 448 and marker 446 will alter the transverse distance $\Delta Y$ between the marker 446 and the coils 454, 455. This will change the field perturbation by the marker 446, which will be sensed predominantly by the first coil 454. The sensitivity of the second coil 455 to the changing field perturbation will be considerably less, due to its longitudinal displacement.

Each of the oscillators 456, 457 is connected with output terminals to a mixer unit 458, which senses the oscillator output signals that oscillate at slightly different frequencies. The mixer unit 458 subtracts these interacting outputs to create a beat frequency signal associated with the frequency difference. An output 460 of the mixer 458 conveys the resulting beat frequency signal to an analogue to digital converter (ADC), which in turn is configured to forward the digitized difference signal to the processor 444.

The processor 444 receives measured signal amplitudes from all of the transducers 443 at associated measurement times, and derives indications of displacement $\Delta Y$ for each gasket surface portion 448 corresponding with these times, based on the measured difference signals and pre-calibrated and/or modelled resonance-vs-displacement information.

It should be understood that the coils may be placed in other configurations as commonly known from metal detectors.

Figure 7:
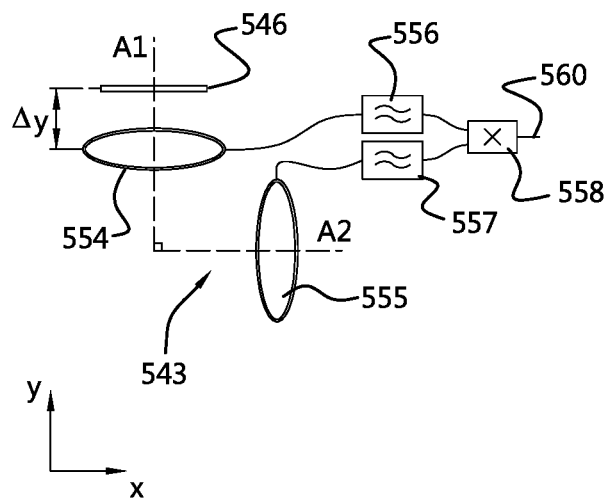
FIG. 7 illustrates a sensor implementation according to an alternative embodiment.

FIG. 7 schematically illustrates implementation details of an alternative EM transducer 543 in a sensor system that is similar to system 440 described above with reference to FIGS. 6a-6c. Here, the EM transducer 543 includes two tuned and resonating EM coils 554, 555, which are placed in mutually orthogonal orientations. A first coil 554 is placed with a first coil axis A1 substantially parallel with a (local) normal vector of the associated EM marker 546 at the nearby gasket surface portion, and serves as a sensing coil. A second coil 555 is placed with a second coil axis A2 substantially perpendicular to the first axis A1 and to this surface normal vector, and serves as a reference coil. In practice, coils 554 and 555 have multiple turns. The orthogonality of coil axes A1 and A2 yields magnetic decoupling between coils 554 and 555. The coils 554, 555 have identical dimensions and number of turns, to allow compensation for temperature-induced disturbances. This transducer 543 has a similar beat frequency oscillator (BFO) circuit with elements 556, 557, 558, 560 as described herein above with reference to FIG. 6*c*.

Figure 8A:
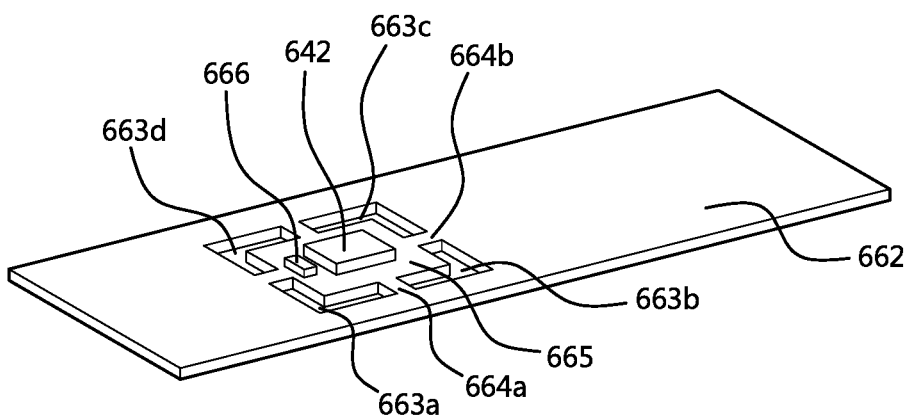
FIGS. 8a-8b show perspective views of opposite sides of a sensor component in a system according to an embodiment.
Figure 8B:
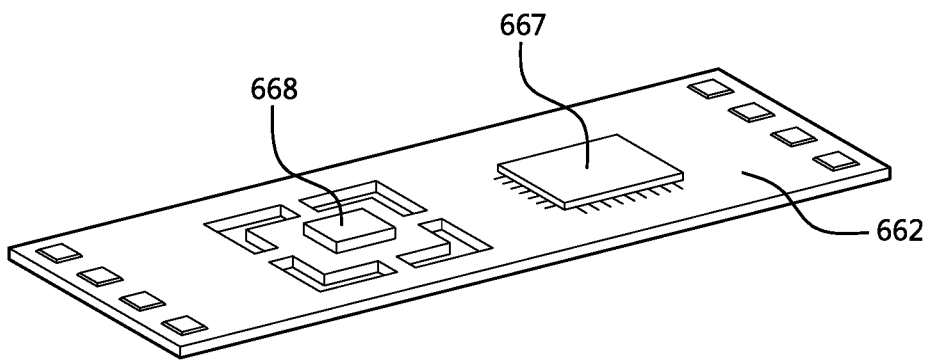

FIG. 8*a* shows a perspective view of a first side a sensor component with a temperature regularization function, and FIG. 8*b* shows a perspective view of a second (opposite) side of this sensor component. This sensor component includes a substrate 662, a position sensor 642, a temperature sensor 666, a heater element 668, and a temperature controller 667.

The position sensor 642 may be any of the sensors for measuring indications of gasket surface position as described herein above. In this example, the substrate 662 is formed as a printed circuit board (PCB) 662. This PCB 662 defines a first surface, which is associated with the side of the PCB 662 on which the position sensor 642 is arranged (FIG. 8*a*). The PCB 662 defines a second surface (FIG. 8*b*) opposite to the first surface.

The PCB 662 includes four L-shaped cut-outs 663*a-d*, which jointly extend around and enclose a partly isolated portion 665 of the PCB 662 where the sensor 642 is located. Each cut-out 663 extends entirely through the PCB 662 and between the first and second surfaces thereof. In this example, the cut-outs 663 have been milled out of the PCB 662, and are provided to increase thermal resistance and to thermally decouple the partly isolated portion 665 from the remainder of the PCB 662. Within the plane of the PCB, the cut-outs 663 are mutually separated by bridge portions 664. These bridge portions 664 mechanically connect the partly isolated portion 665 to a remainder of the substrate that surrounds the cutouts 663 and the partly isolated portion 665. Four bridge portions 664 are provided in this example, which are arranged in two pairs that extend in orthogonal directions along the plane of the PCB 662, in order to prevent mechanical displacement of this portion 665 relative to the remainder of the PCB 662. The cut-outs 663 and bridge portions 664 are arranged in a rectangular symmetric distribution around the partly isolated portion 665.

The temperature sensor 666 is arranged together with the sensor 642 on the partly isolated portion 665 and at the first side of the PCB 662. This temperature sensor 666 is configured to continuously or intermittently measure indications of temperature of the position sensor 642 during operation of the sensor system.

The heater element 668 is also arranged near the sensor 642 on the partly isolated portion 665 of the PCB 662, but at the second side thereof. This heater element 668 is configured to provide heat to the position sensor 642 during operation of the sensor system.

The temperature controller 667, which in this example is formed as a microcontroller, is arranged at the remaining portion of the PCB 662 i.e. not at the partly isolated portion 665. This microcontroller 667 is electronically coupled to both the temperature sensor 666 and the heater element 668. The microcontroller 667 is configured to process the indications of temperature received from the temperature sensor 666, and to control the heater element 668 in response to the received temperature indications in order to keep a temperature of the sensor 642 at a stable predetermined value, which is above a maximum ambient temperature of the space 38 enclosed by the gasket 30 and adjacent edges 24, 25 of the structural members 20, 21 (see FIG. 2*b*). The temperature control function implemented in the software continuously adjusts the amount of heating power, to maintain a constant temperature reading of the temperature sensor 666. The microcontroller 667 may be configured to perform this temperature regularization function using a proportional-integral (PI) or proportional-integral-derivative (PID) controlling feedback scheme, which are well known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

LIST OF REFERENCE SYMBOLS

Similar reference numbers that have been used in the description to indicate similar elements (but differing only in the hundreds) have been omitted from the list below, but should be considered implicitly included.

10 tunnel
12 soil
14 soil surface
16 water level
18 interior tunnel region (e.g. passageway)
20 first structural member (e.g. tunnel segment)
21 second structural member (e.g. adjacent tunnel segment)
22 first wall
23 second wall
24 first edge (e.g. first wall edge)
25 second edge (e.g. second wall edge)
26 first inner wall surface
27 second inner wall surface
28 cover plate
30 gasket
32 inner gasket member (e.g. secondary seal)
34 outer gasket member (e.g. endless primary seal)
36 inner gasket surface
38 annular space
40 sensor system
42 position sensor
44 processor
46 marker
47 reference marker
48 local surface portion (of gasket)
49 marker trajectory
141 wire harness
145 sensor mount (e.g. mounting plate, bracket)
243 optical transceiver
250 optical signal
251 optical return signal
252 wiper
353 wiper actuator
443 EM transceiver
446 EM marker
450 EM field
454 first coil (e.g. sensor coil)
455 second coil (e.g. reference coil)
456 first oscillator
457 second oscillator
458 mixer
460 mixer output (e.g. to counter, TDC, or ADC)
662 substrate (e.g. printed circuit board)
663 through opening (e.g. cut-out)
664 bridge portion
665 partly isolated substrate portion
666 temperature sensor
667 temperature controller (e.g. microcontroller)
668 heater element
X first direction (longitudinal direction)
Y second direction (transversal direction)
Z third direction (vertical direction/axial direction)
ΔY local gasket displacement

The invention claimed is:

1. A sensor system for monitoring in time a geometric property of a gasket, the sensor system comprising:
a sensor, configured to measure indications of position for a plurality of gasket surface portions at different measurement times and relative to a reference associated with at least one of a plurality of tubular structural members of a tunnel; and
a processor, communicatively coupled with the sensor to receive the measured indications of position, and configured to:
derive indications of displacement for each of the gasket surface portions based on the measured indications of position;
compare the indications of displacement for each of the gasket surface portions with at least one threshold value, and
generate a warning message when at least one of the indications of displacement transgresses the at least one threshold value,
wherein the gasket sealingly interconnects and extends along a path between adjacent edges of two tubular structural members of the plurality of tubular structural members of the tunnel of an at least partially subterraneous and/or immersed structure,
wherein the tunnel extends in a longitudinal direction and has an interior region, and wherein the gasket forms a closed annular trajectory along the adjacent edges of the two tubular structural members.

2. The sensor system according to claim 1, wherein the tubular structural members are positioned so that the adjacent edges enclose a space with a non-zero gap width in the longitudinal direction, and wherein the sensor is configured to be inside the space between the adjacent edges.

3. The sensor system according to claim 2, wherein the gasket forms a composite gasket that comprises:
an inner gasket member extending in an annular path along the adjacent edges of the tubular structural members, and facing an interior region of the structure;
an outer gasket member extending in a further annular path along the adjacent edges and around the inner gasket member;
wherein the space forms an annular space enclosed between the inner and outer gasket members and the adjacent edges of the tubular structural members;
and wherein the sensor is configured to be positioned inside the annular space and to measure a geometric property of the outer gasket member or the inner gasket member.

4. The sensor system according to claim 3, wherein the gasket surface portions form parts of an inner gasket surface that faces towards an interior region of the structure;
wherein the sensor is configured to measure indications of transverse position for the gasket surface portions, relative to a first or a second wall of the tubular structural members;
and wherein the processor is configured to derive indications of transverse inwards displacement for each of the gasket surface portions based on the measured indications of transverse position.

5. The sensor system according to claim 2, wherein the gasket is mechanically and sealingly fixed to a first edge of a first tubular structural member, and abuts a second edge of a tubular second structural member while allowing slight relative motion maintaining a sealing engagement with the second edge;
wherein the gasket surface portions that are observed by the sensor are located at non-zero distances from the second edge and along the longitudinal direction, the distances being smaller than half of the gap width.

6. The sensor system according to claim 1, wherein the gasket surface portions are arranged in a sequence of distinct surface positions along the gasket;
wherein the sensor system comprises a plurality of optical markers that are configured to be attached to the gasket surface portions;
and wherein the sensor is a camera that is configured to be placed at or near an edge of one of the structural members, and to acquire images of the optical markers that include the indications of position for the gasket surface portions at the measurement times.

7. The sensor system according to claim 6, wherein the gasket has a substantially linear gasket segment that extends along the adjacent edges of the structural members, and along which the distinct surface positions with the optical markers are consecutively arranged;

and wherein the camera has a field of view that is directed substantially along the linear gasket segment.

8. The sensor system according to claim 6, wherein the optical markers each comprise an optical reflector or an active light source, and a base for attaching the respective marker to a corresponding gasket surface portion.

9. The sensor system according to claim 6, further comprising at least one optical reference marker that is configured to be fixed to at least one wall of the structural members at or near the corresponding one of the adjacent edges thereof;

and wherein the camera is configured to acquire images of the optical markers and the optical reference marker, to obtain the indications of position for the gasket surface portions relative to the at least one of the walls.

10. The sensor system according to claim 1, wherein the gasket surface portions are arranged in a sequence of distinct positions along the gasket, wherein the sensor system comprises:

a plurality of optical reflectors that are configured to be attached to the gasket surface portions, and at least one directional optical radiation source that is configured to be placed at a source position at or near an edge of one of the structural members, and to emit a beam of optical radiation towards the optical reflectors;

and wherein the sensor is an optical photogrammetric sensor that is configured to be placed at a sensor position or near an edge of one of the structural members, to receive reflected beams from the optical reflectors, and to measure reflection angles for the reflected beams corresponding with the position indications for the gasket surface portions.

11. The sensor system according to claim 1, wherein in the gasket surface portions form a sequence of line segments along the gasket;

wherein the sensor includes a plurality of optical fibers that are configured to be attached to the gasket at respective gasket surface portions, and is configured to measure mechanical deformations of the optical fibers corresponding with the position indications for the gasket surface portions;

and wherein the processor is configured to calculate the indications of displacement for each of the gasket surface portions using fiber Bragg grating, FBG, techniques.

12. The sensor system according to claim 1, wherein in the gasket surface portions are arranged in a sequence of distinct positions along the gasket;

wherein the sensor includes a plurality of optical transceivers that are configured to be attached in a sequence along an edge of at least one of the structural members and facing respective ones of the gasket surface portions, wherein each of the optical transceivers is configured to emit optical radiation towards a respective gasket surface portion, to receive further optical radiation returned by the respective gasket surface portion, and to measure the indications of position based on a comparison between the emitted and received optical radiations;

and wherein the processor is configured to derive the indications of displacement for each of the gasket surface portions based on the measured indications of position.

13. The sensor system according to claim 12, wherein the optical transceivers are configured to emit the optical radiation as pulses towards the respective gasket surface portions, and configured to receive the further optical radiation as return pulses reflected by the respective gasket surface portions, wherein the indications of position are time differences measured between emission of pulses and subsequent receipt of return pulses;

and wherein the processor is configured to calculate travel distances from the measured time differences and a predetermined value for a propagation speed of the optical radiation, to derive the indications of displacement for each of the gasket surface portions.

14. The sensor system according to claim 1, wherein the gasket surface portions are arranged in a sequence of distinct positions along the gasket;

wherein the sensor includes a plurality of acoustic transducers that are configured to be attached in a sequence along an edge of at least one of the tubular structural members and facing respective ones of the gasket surface portions, wherein each of the acoustic transducers is configured to emit an acoustic pulse towards a respective gasket surface portion, and to receive an acoustic return pulse reflected by the respective gasket surface portion, wherein the indications of position are time differences measured between emission of the acoustic pulses and subsequent receipt of the acoustic return pulses;

and wherein the processor is configured to calculate travel distances from the measured time differences and a predetermined value for acoustic propagation speed, to derive the indications of displacement for each of the gasket surface portions.

15. The sensor system according to claim 14, wherein the acoustic transducers are configured to emit and receive signal pulses, wherein a space between the adjacent edges of the tubular structural members in which the sensor is accommodated is filled with a liquid, and wherein the processor is configured to convert readings from optical transceivers or acoustic transducers by multiplying with a ratio of a propagation speed of light or sound in the liquid to a propagation speed of light or sound in air.

16. The sensor system according to claim 1, wherein the gasket surface portions are arranged in a sequence of distinct positions along the gasket;

wherein the sensor system comprises a plurality of electromagnetic (EM) markers that are configured to be attached to respective gasket surface portions;

wherein the sensor includes a plurality of EM transducers that are configured to be attached along an edge of at least one of the structural members, with each transducer facing a respective one of the EM markers, wherein the EM transducers are configured to continuously generate EM fields, and to detect perturbations of the EM fields caused by the EM markers, to acquire the indications of position.

17. The sensor system according to claim 1, further comprising:
- a temperature sensor arranged at or near the sensor, and configured to continuously or intermittently measure indications of temperature of the sensor during operation of the sensor system;
- a heater element arranged at or near the sensor, and configured to provide heat to the sensor;
- a temperature controller, in signal communication with the temperature sensor and the heater element, and configured to process the indications of temperature received from the temperature sensor and to control the heater element in order to keep a temperature of the sensor at a stable value above a maximum ambient temperature of a space enclosed by the gasket and adjacent edges of the tubular structural members.

18. The sensor system according to claim 17, comprising a substrate that defines a first surface on which the sensor is arranged, the substrate including cut-outs that extend from the first surface, entirely through the substrate, to a second surface of the substrate opposite to the first surface, wherein the cut-outs extend around and enclose a partly isolated portion of the substrate where the sensor is located, and wherein the cut-outs are mutually separated by bridge portions that mechanically connect the partly isolated portion to a remainder of the substrate that surrounds the cut-outs and the partly isolated portion.

19. A method for monitoring in time a geometric property of a gasket, the method comprising:
- measuring, with a sensor, indications of position for a plurality of gasket surface portions at different measurement times and relative to a reference associated with at least one of a plurality of tubular structural members of a tunnel;
- deriving, with a processor, indications of displacement for each of the gasket surface portions based on the indications of position measured by the sensor;
- comparing, with the processor, the indications of displacement for each of the gasket surface portions to at least one threshold value, and
- generating a warning message for an operator if at least one of the indications of displacement transgresses the at least one threshold value,
- wherein the gasket sealingly interconnects and extends along a path between adjacent edges of two structural members of a plurality of tubular structural members of the tunnel of an at least partially subterraneous and/or immersed structure,
- wherein the tunnel extends in a longitudinal direction and has an interior region, and wherein the gasket forms a closed annular trajectory along the adjacent edges of the two tubular structural members.

20. A non-transitory computer readable medium storing instructions, which when executed by one or more processors that is/are communicatively coupled with a sensor in a sensor system, cause the one or more processors to:
- measure, with the sensor, indications of position for a plurality of gasket surface portions at different measurement times and relative to a reference associated with at least one of a plurality of structural members of a tunnel;
- derive, with processor, indications of displacement for each of the gasket surface portions based on the indications of position measured by the sensor;
- compare, with the processor, the indications of displacement for each of the gasket surface portions to at least one threshold value, and
- generating a warning message for an operator if at least one of the indications of displacement transgresses the at least one threshold value,
- wherein the gasket sealingly interconnects and extends along a path between adjacent edges of two tubular structural members of the plurality of tubular structural members of the tunnel of an at least partially subterraneous and/or immersed structure,
- wherein the tunnel extends in a longitudinal direction and has an interior region, and wherein the gasket forms a closed annular trajectory along the adjacent edges of the two tubular structural members.

* * * * *